United States Patent
Dumitriu

(10) Patent No.: US 6,367,990 B1
(45) Date of Patent: Apr. 9, 2002

(54) HEAT-SHRINKABLE TUBE FOR PROTECTION OF OPTICAL FIBER SPLICES

(75) Inventor: Ion Dumitriu, Nynäshamn (SE)

(73) Assignee: Telefonaktiebolaget LM Ericsson, (publ), Stockholm (SE)

( * ) Notice: Subject to any disclaimer, the term of this patent is extended or adjusted under 35 U.S.C. 154(b) by 0 days.

(21) Appl. No.: 09/487,993

(22) Filed: Jan. 20, 2000

(30) Foreign Application Priority Data

Jan. 20, 1999 (SE) .............................................. 9900174

(51) Int. Cl.[7] .............................................. G02B 6/255
(52) U.S. Cl. ........................................... 385/99; 385/95
(58) Field of Search ..................................... 385/95–99

(56) References Cited

U.S. PATENT DOCUMENTS 4,509,820 A * 4/1985 Murata et al. ................. 385/99
5,731,051 A * 3/1998 Fahey et al. ................ 428/34.9
6,099,170 A * 8/2000 Sarbell ......................... 385/99

FOREIGN PATENT DOCUMENTS

EP 0 638 827 A1 2/1995

* cited by examiner

Primary Examiner—Hemang Sanghavi
Assistant Examiner—Scott Knauss
(74) Attorney, Agent, or Firm—Nixon & Vanderhye P.C.

(57) ABSTRACT

A packaging assembly for protecting splices of optical fibers comprises an inner heat-shrinkable tube, an outer thinner heat-shrinkable tube and a reinforcing rod. The reinforcing rod has a metal layer on a flat surface thereof. When heating the assembly for applying it tightly to a splice an electrical current is passed through the metal layer. Then heat is developed which causes the tubes to shrink. The metal layer can be applied to have a larger resistance in its central region where it then will be heated first, the shrinking of the tubes then also starting in the central region, as seen in the longitudinal direction of the tubes. The metal layer can be made to act like an electrical fuse, being evaporated when the heat is sufficiently intensive and then automatically interrupting the electrical current.

14 Claims, 1 Drawing Sheet

HEAT-SHRINKABLE TUBE FOR PROTECTION OF OPTICAL FIBER SPLICES

The invention is related to protecting splices of optical fibers, in particular to heating a heat-shrinkable tube in order to make the tube shrink around a splice of optical fibers which is to be protected, and more particularly to an assembly including a heat-shrinkable tube intended to be used for protecting splices of optical fibers.

BACKGROUND

Optical fibers are presently widely used for communicating information such as in large telecommunication systems, primarily owing to their large reliability, their insensitivity to electrical interference and their high capacity. In order to facilitate handling optical fibers, they are often provided as fiber ribbons, in which a plurality of optical fibres are located adjacent to each other, optically isolated from each other and from the environment, but in some manner fixed in parallel to each other, for example by means of a polymer coating. Such a ribbon usually contains 4, 6, 8 or 12 parallel fibers.

When splicing two different optical fibers, which is usually performed by welding, the polymer coatings of the fibers must first be removed. Thus, both the individual coating of the optical fibers and the material, which secures the fibers to each other to form a fiber ribbon, must be removed. Thereupon the uncovered or bare fibres are cut in order to thereafter be welded to each other.

Heat-shrinkable tubes are often used for protecting such splices of optical single fibers and of optical ribbon fibers, which are used in the telecommunication field. Then such a tube is applied over an end of a single fiber or of an optical fiber cable such as a ribbon fiber, and then the cable is spliced to another cable. Finally the heat-shrinkable tube is moved to cover the bare portions of the optical fibers and then heated making it shrink and be firmly attached around the bare portions and to the splice. When heating the tube it must be carefully observed that no air remains inside the shrinking tube since such remaining air degrades the mechanical supporting and protecting function of the tube.

When heating the protection tubes often ovens are used having a U-shape. Also resistance wires applied inside the tube have been proposed. Thus, in U.S. Pat. No. 4,509,820 a protective packaging assembly for a spliced portion of optical fibers is disclosed, the assembly incorporating one or more electrical resistance heating elements on the inner side of a heat-shrinkable tube in order to be capable of heating both the tube and a hot-melt adhesive. Electrical heating elements for heat-shrinkable tubes are also disclosed in the Japanese patent applications 58-009111, 58-009112, 58-009113, 60-061705, 7-248425, 58-023008, 54-118254. A problem existing in such protective packaging assemblies comprises the selection, when conducting an electrical current through a heating resistance element of a protective assembly for shrinking a protection sleeve, of the time when the heating is sufficient and the electrical current is to be interrupted.

SUMMARY

It is an object of the invention to provide a protection assembly for optical fiber splices which has a reinforcing member and which can be easily produced.

It is another object of the invention to provide a protection assembly for optical fiber splices which can be easily used, not requiring extra control equipment.

In particular, a problem solved by the invention is how to reduce the risk of air being trapped inside a sleeve for protecting optical fiber splices and how to produce such a sleeve in a simple and reliable way.

Another problem solved by the invention is how to select, when conducting an electrical current through a heating resistance element of a protection assembly for shrinking a protection sleeve, the time when the heating is sufficient and the electrical current is to be interrupted.

Thus generally, a packaging assembly for protecting splices of optical fibers comprises as conventional an outer thin heat-shrinkable tube, preferably an inner, thicker heat-shrinkable tube, and a reinforcing rod. The reinforcing rod has an electrically conductive coating such as a metal layer on some surface, e.g. a flat surface, thereof. When heating the assembly for applying it tightly to a splice an electrical current is passed through the metal layer. Then heat is developed which causes the tubes to shrink. The metal layer can be applied to have a larger resistance in its central region where it then will be heated first, the shrinking of the tubes then also starting in the central region, as seen in the longitudinal direction of the tubes. This reduces the risk of forming trapped air bubbles. The metal layer can be made to act like an electrical fuse, being evaporated when the heat is sufficiently intensive and then interrupting the electrical current. This provides an easy and automatic operation of the assembly. This operation like an electrical fuse can obviously also be obtained for other forms of the heating resistance element different from a layer, for example by applying inside the tube or tubes any elongated element, such as a resistance wire, the element having a smaller cross-sectional area at its central portion or by using an elongated element made of a material having a resistance per unit which is larger in the central portion than in end portions thereof.

Applying a metal layer, e.g. a metal sheet cut a suitable shape, to a surface of the reinforcing rod, is a very simple operation. Obviously the resistance in the longitudinal direction of such a layer is also very easily controlled. For example the layer can easily be made narrower in its central portion where it will then have a higher resistance and thus be heated first and most intensely. The metal layer can also be printed on a flat surface and thereupon etched what will provide a very accurate control of the resistance of the various parts of the metal layer. Generally thus, in a central portion of such a layer of an electrically conductive material as seen in a longitudinal direction of the layer, the layer will then have a larger resistance per unit length as taken in the longitudinal direction of the layer than in end portions of the layer. Termed in another way, the layer of such an electrically conductive material generally has a substantially uniform resistivity and in order to obtain a more intense heating where required, it can thus have a smaller cross-sectional area in its central portion as seen in a longitudinal direction of the layer than in end portions of the layer.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
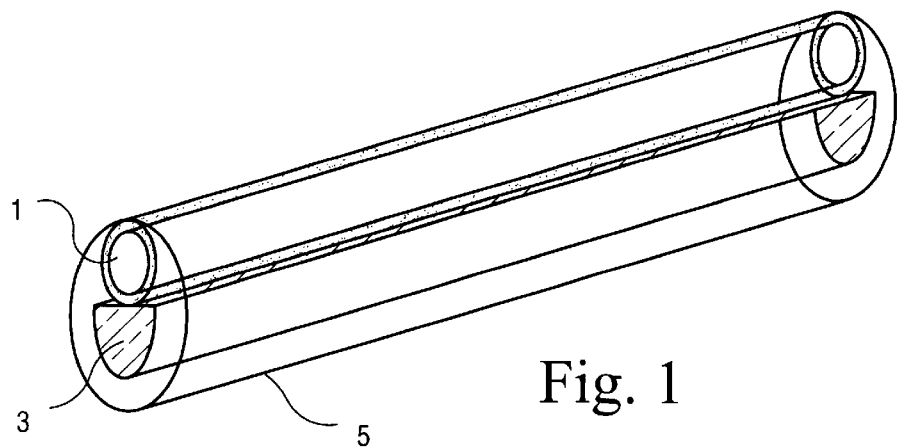
FIG. 1 is a perspective view of a conventional heat-shrinkable tube for protecting fusioned optical fiber splices.

A conventional assembly for protecting a splice of two optical fibers is shown in the perspective view of FIG. 1. The assembly comprises an inner heat-shrinkable tube 1 made of a thick artificial resin material, a stiff glass-rod 3 having a D-shaped cross-section and an outer heat-shrinkable tube 5 made of a thin artificial resin material. The outer tube 5 surrounds the two other components and keeps the other components in their places to form the assembly. In some cases no inner tube 1 is used, the outer tube 5 then being made thicker. The flat surface of the rod 3 is in contact with the outer surface of the inner tube 1. When making a splice between two optical fibers, not shown, the assembly is applied around one of the fibers by letting the fiber pass from one side of the assembly through the inner tube 1 to expose its end on the other side of the assembly. A portion of the exposed end is then rid of its protective polymer layer and the bare end portion is fusion-spliced to the end of the other optical fiber, from which also the protective coating has been removed. Thereupon the protective assembly is made to slide along the spliced fibers to cover the bare portions of the fibers. The protective assembly is heated to make the tubes 1, 5 shrink and to apply the inner tube final to the splice portion and the bare fiber portions and to hold the reinforcing rod 3 with a suitable force at the splice.

Figure 2:
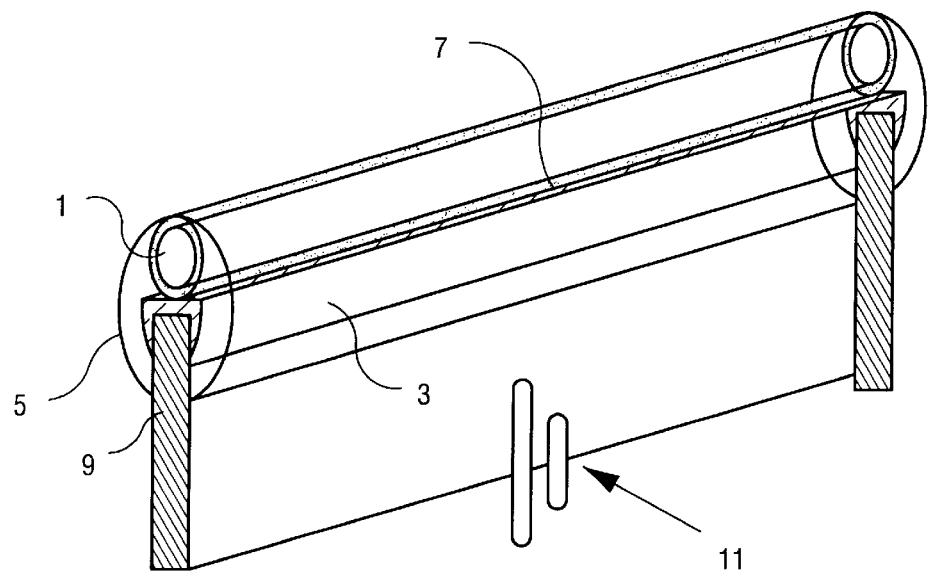
FIG. 2 is a perspective view of heat-shrinkable tube having a heating resistance element connected to an electrical power supply.

The conventional heat-shrinkable assembly of FIG. 1 can be modified to include a resistance heating element as illustrated in the perspective view of FIG. 2. The glass rod 3 has a coating 7 on its flat surface, the coating being made of an electrically conducting material such as a suitable metal. The coating extends to the end surfaces of the rod, where it can be electrically contacted, as also seen in the figure, by electric terminals 9 of a power supply 11. Then an electrical current can pass through the conductive coating 7 and heat it and thereby the glass rod 3, the inner tube 1 and the outer tube 5, in order to make the tubes shrink to seal the splice portion.

Figure 3:
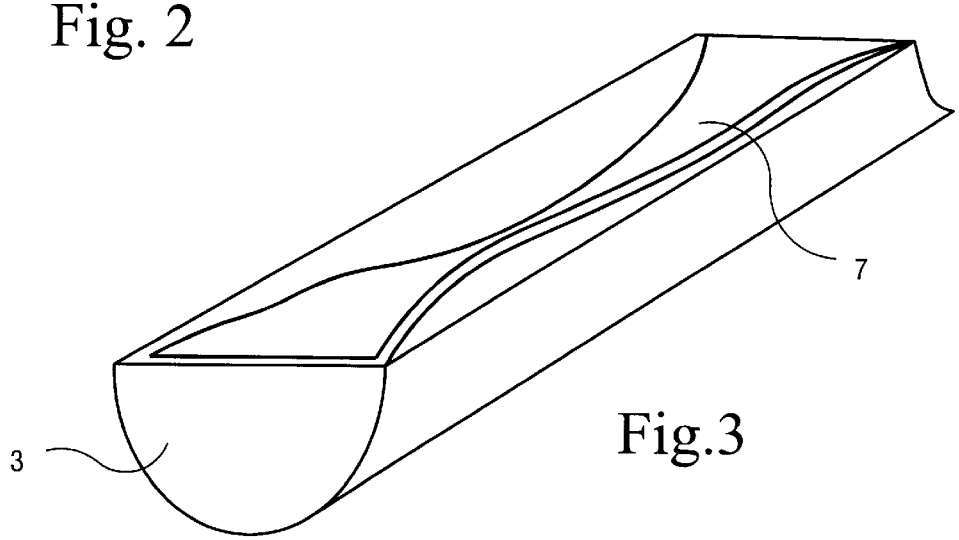
FIG. 3 is a perspective view of a reinforcing rod having an electrically conducting layer on a flat surface.

The conductive coating or layer 7 can have a higher resistance in its central portion, at the centre of the glass rod, as seen in the longitudinal direction thereof. Such a conductive layer is illustrated in FIG. 3. The conductive layer is there shown to be narrower in its central region. This will make the heat developed when connecting the conductive layer to a power supply be larger in the central region, then starting the shrinking operation of the tubes at the central regions thereof, also as seen in the longitudinal directions thereof. This operation will reduce the risk of obtaining air bubbles trapped inside the heat-shrinkable tubes.

The conductive layer preferably has a uniform thickness. The thickness and the width in the central region according to FIG. 3 can be selected so that the conductive layer or metal layer is evaporated in the central region when a sufficiently high temperature has been obtained, i.e. generally after a predetermined time for a predetermined electric current being applied to the layer when starting the heating or a predetermined voltage being applied to the layer. Then the heating is automatically interrupted and the shrinking operation is complete.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. An assembly for protecting bar portions of optical fibers and/or splice portions of optical fibers, the assembly comprising an outer heat-shrinkable tube and a reinforcing rode made of an electrically isolating material and located inside the outer heat-shrinkable element located inside the outer heat-shrinkable tube and comprising a layer of an electrically conductive material applied to or at a surface of the reinforcing rod, wherein the layer of electrically conductive material is designed so that when conducting a predetermined electric current for a predetermined time period, the layer will at least partly evaporate breaking a current path through the layer, thereby automatically shutting off heating of the heat-shrinkable tube.

2. The assembly of claim 1, wherein the reinforcing rod has a substantially flat surface and the layer of an electrically conductive material is applied to the substantially flat surface.

3. The assembly of claim 1, wherein in a central portion of the layer of an electrically conductive material, taken in a longitudinal direction of the layer, the layer has a larger resistance per unit length taken in the longitudinal direction of the layer than in end portions of the layer.

4. The assembly of claim 1, wherein the layer of an electrically conductive material has a substantially uniform resistivity and has a smaller cross-sectional area in its central portion taken seen in a longitudinal direction of the layer than in end portions of the layer.

5. The assembly of claim 1, wherein the layer of an electrically conductive material has a substantially uniform resistivity and a substantially uniform thickness and has a smaller width in its central portion taken in a longitudinal direction of the layer than in end portions of the layer.

6. The assembly of claim 1 further comprising an inner tube of a heat-shrinkable material located inside the outer tube and the reinforcing rod being located outside the inner tube.

7. An assembly for protecting bare portions of optical fibers and/or splice portions of optical fibers, the assembly comprising an outer heat-shrinkable tube and a reinforcing rod made of an electrically isolating material and located inside the outer heat-shrinkable tube, wherein the assembly further comprises an electrically conductive resistance element located inside the outer heat-shrinkable tube, the electrically conductive resistance element having such a cross-sectional area and being made of such a material that when conducting a predetermined electric current through the element and thereby heating the element and adjacent components of the assembly the element will after a predetermined time period at least partly evaporate to break a path of the electrical current through the element in order to automatically shut off the electrical current and thereby the heating.

8. A method of producing an assembly for protecting bare portions of optical fibers and/or splice portions of optical fibers, the method comprising the steps of:

providing an outer heat-shrinkable tube, placing a reinforcing rode made of an electrically isolating material inside the outer heat-shrinkable tube, placing an electrically conductive resistance element also inside the outer heat-shrinkable tube, wherein, in the step of placing the electrically conductive resistance element, a layer of an electrically conductive material is applied to or at a surface of the reinforcing rod to form the electrically conductive resistance element, and wherein the layer of electrically conductive material is designed so that when conducting a predetermined electric current through the layer for a predetermined time period, the layer at least partly evaporates breaking a current path through the layer, thereby automatically shutting off heating of the heat-shrinkable tube.

9. The method of claim 8, wherein, in applying the layer of an electrically conductive material, the layer is applied to a substantially flat surface of the reinforcing rod.

10. The method of claim 8, wherein, in applying the layer of an electrically conductive material, the layer is applied to have, in a central portion of the layer material, taken in a longitudinal direction of the layer, a larger resistance per unit length, taken in the longitudinal direction of the layer, than in end portions of the layer.

11. The method of claim 8, wherein, in applying the layer of an electrically conductive material, the layer is applied to have a substantially uniform resistivity and a smaller cross-sectional area in its central portion, taken in a longitudinal direction of the layer, than in end portions of the layer.

12. The method of claim 8, wherein, in applying the layer of an electrically conductive material, the layer is applied to have a substantially uniform resistivity and a substantially uniform thickness and a smaller width in its central portion, taken in a longitudinal direction of the layer, than in end portions of the layer.

13. The method of claim 8 further comprising the additional step of placing an inner tube of a heat-shrinkable material inside the outer heat-shrinkable tube and around the reinforcing rod.

14. A method of producing an assembly for protecting bare portions of optical fibers and/or splice portions of optical fibers, the method comprising the steps of:

providing an outer heat-shrinkable tube, placing a reinforcing rod made of an electrically isolating material inside the outer heat-shrinkable tube, placing an electrically conductive resistance element also inside the outer heat-shrinkable tube, wherein, in the step of placing the electrically conductive resistance element, the electrically conductive resistance element is given such a cross-sectional area and the material of the electrically conductive resistance element is so selected that when conducting a predetermined electric current through the electrically conductive resistance element and thereby heating the electrically conductive resistance element and adjacent components of the assembly the electrically conductive resistance element will after a predetermined time period at least partly evaporate to break a path of the electrical current through the electrically conductive resistance element in order to automatically shut off the electrical current and thereby the heating.

\* \* \* \* \*

UNITED STATES PATENT AND TRADEMARK OFFICE
CERTIFICATE OF CORRECTION

PATENT NO. : 6,367,990 B1
DATED : April 9, 2002
INVENTOR(S) : Ion Dumitriu

It is certified that error appears in the above-identified patent and that said Letters Patent is hereby corrected as shown below:

Column 5,
Line 11, please change "rode" to -- rod --.

Signed and Sealed this

Twenty-eighth Day of May, 2002

Attest:

Attesting Officer

JAMES E. ROGAN
*Director of the United States Patent and Trademark Office*